(12) United States Patent
Norton et al.

(10) Patent No.: US 10,294,846 B2
(45) Date of Patent: May 21, 2019

(54) SYSTEMS FOR VEHICLE PARTICULATE FILTER REGENERATION

(71) Applicant: General Electric Company, Schenectady, NY (US)

(72) Inventors: Daniel George Norton, Wynantskill, NY (US); Thomas Michael Lavertu, Clifton Park, NY (US); Roy James Primus, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 93 days.

(21) Appl. No.: 15/670,063

(22) Filed: Aug. 7, 2017

(65) Prior Publication Data
US 2018/0058296 A1 Mar. 1, 2018

Related U.S. Application Data

(60) Provisional application No. 62/382,022, filed on Aug. 31, 2016.

(51) Int. Cl.
*B60T 7/12* (2006.01)
*F01N 9/00* (2006.01)
(Continued)

(52) U.S. Cl.
CPC ............... *F01N 9/002* (2013.01); *F01N 3/00* (2013.01); *F01N 3/0253* (2013.01);
(Continued)

(58) Field of Classification Search
CPC ............... F02D 35/0015; F02D 41/005; F02D 41/0055; F02D 41/0072; F02D 41/0077
(Continued)

(56) References Cited

U.S. PATENT DOCUMENTS 6,212,881 B1 * 4/2001 Takahashi ........... F02D 41/0055
123/568.15
6,912,848 B2 7/2005 Bedapudi
(Continued)

OTHER PUBLICATIONS

Hayashi et al., "Electrostatic Charging and Precipitation of Diesel Soot", IEEE Transactions on Industry Applications, vol. 47, Issue: 1, pp. 331-335, Jan.-Feb. 2011.
(Continued)

*Primary Examiner* — John Kwon
(74) *Attorney, Agent, or Firm* — Christopher R. Carroll; The Small Patent Law Group LLC

(57) ABSTRACT

A system includes one or more processors configured to be operably coupled to a vehicle system configured to travel along a route during a trip. The vehicle system has a vehicle particulate filter (VPF) disposed within an exhaust passage of the vehicle system. The one or more processors are configured to determine, based on trip information about the trip of the vehicle system, one or more regeneration-incompatible (RI) portions of the trip. The RI portions are associated with operating conditions of the vehicle system that are unsuitable for contemporaneous active regeneration of the VPF. The one or more processors are further configured to schedule an active regeneration (AR) event for the vehicle system based on the one or more RI portions of the trip. The AR event occurs during a regeneration portion of the trip.

24 Claims, 4 Drawing Sheets

(51) Int. Cl.
  *F02D 41/30* (2006.01)
  *F01N 3/025* (2006.01)
  *F02M 26/52* (2016.01)
  *F02D 41/26* (2006.01)
  *F02D 41/02* (2006.01)
  *F02D 41/40* (2006.01)
  *F01N 3/00* (2006.01)
  *F02D 41/00* (2006.01)

(52) U.S. Cl.
  CPC ......... *F02D 41/005* (2013.01); *F02D 41/029* (2013.01); *F02D 41/26* (2013.01); *F02D 41/3005* (2013.01); *F02D 41/405* (2013.01); *F02M 26/52* (2016.02); *F01N 2610/03* (2013.01); *F01N 2900/04* (2013.01); *F01N 2900/10* (2013.01); *F02D 2200/0812* (2013.01); *F02D 2200/701* (2013.01); *Y02T 10/44* (2013.01); *Y02T 10/47* (2013.01)

(58) Field of Classification Search
  USPC .................. 701/101, 108, 110, 114, 115
  See application file for complete search history.

(56) References Cited

U.S. PATENT DOCUMENTS

| | | | |
|---|---|---|---|
| 7,925,431 | B2 | 4/2011 | Gallagher et al. |
| 8,413,429 | B2 * | 4/2013 | Gioannini ............... F01N 3/023 |
| | | | 60/274 |
| 8,868,266 | B2 | 10/2014 | Gallagher et al. |
| 8,903,575 | B2 | 12/2014 | Mischler et al. |
| 9,103,248 | B2 | 8/2015 | Light-Holets |
| 2012/0204537 | A1 | 8/2012 | Dea et al. |
| 2014/0207316 | A1 | 7/2014 | Kolambekar |
| 2016/0333829 | A1 * | 11/2016 | Takahashi ............... F02M 26/33 |
| 2018/0068497 | A1 * | 3/2018 | Kurtz ................... F02D 41/021 |

OTHER PUBLICATIONS

Lu et al., "The burning of diesel fuel in the DOC of the particulate filtering system of diesel engine during the regeneration process", Electric Information and Control Engineering (ICEICE), 2011 International Conference on, pp. 5443-5446, Apr. 15-17, 2011, Wuhan.

* cited by examiner

SYSTEMS FOR VEHICLE PARTICULATE FILTER REGENERATION

CROSS-REFERENCE TO RELATED APPLICATIONS

The present application claims the benefit of U.S. Provisional Application No. 62/382,022, which was filed on Aug. 31, 2016 and is incorporated herein by reference in its entirety.

FIELD

Embodiments of the subject matter described herein relate to controlling operations of a vehicle system.

BACKGROUND

Internal combustion engines may utilize a particulate filter in the exhaust to reduce the amount of particulate matter, such as soot, in emitted exhaust gas. The particulate filter traps particulate matter on a porous substrate through (or over) which the exhaust gasses flow. Once a particulate filter reaches its particulate load capacity, back pressure to the engine may increase, decreasing fuel economy. Further, excess particulates may be released to the atmosphere, increasing emissions. In order to remove the particulate matter accumulated on the filter, the particulate matter may be burned off of the filter via an active regeneration process. The regeneration process may be initiated via high temperature of the exhaust gas. The temperature of the exhaust may be high enough to commence and sustain regeneration responsive to the engine operating under relatively high engine loads. If the engine operates under lower engine loads, the exhaust temperature may not be high enough to commence or sustain regeneration, so the engine operation may be altered to increase exhaust heat and thus raise exhaust temperature sufficient for regeneration. However, the excess heat is frequently provided by combusting fuel in the exhaust without creating useful power for the engine, thereby decreasing fuel economy.

Furthermore, the active regeneration process may be relatively hard to control and, if uncontrolled, risks producing heat that can damage the filter and/or other components in the exhaust. For example, the regeneration process is an exothermic reaction that produces heat, which can increase the temperature in the exhaust, speeding up the exothermic reaction and generating additional heat in a process referred to as thermal runaway. As the vehicle system travels along a route for a trip, various engine operating conditions of the vehicle system can negatively affect the control of the active regeneration process, increasing the risk of thermal runaway. For example, if an active regeneration event occurs while the engine operates at a relatively low engine load, such as when idling, the flow rate of the exhaust may not be sufficiently high to dissipate the heat produced as the particulates burn, potentially producing a thermal runaway.

BRIEF DESCRIPTION

In an embodiment, a system includes one or more processors configured to be operably coupled to a vehicle system configured to travel along a route during a trip. The vehicle system has a vehicle particulate filter (VPF) disposed within an exhaust passage of the vehicle system. The one or more processors are configured to determine, based on trip information about the trip of the vehicle system, one or more regeneration-incompatible (RI) portions of the trip. The RI portions are associated with operating conditions of the vehicle system that are unsuitable for contemporaneous active regeneration of the VPF. The one or more processors are further configured to schedule an active regeneration (AR) event for the vehicle system based on the one or more RI portions of the trip. The AR event occurs during a regeneration portion of the trip.

In another embodiment, a system includes one or more processors configured to be operably coupled to a vehicle system configured to travel along a route during a trip. The vehicle system has an engine, a vehicle particulate filter (VPF) disposed within an exhaust passage of the vehicle system that receives exhaust gas from the engine, and an exhaust gas recirculation (EGR) system including an EGR conduit and an EGR valve. The EGR conduit extends from exhaust passage to an intake passage of the engine. The EGR valve regulates an amount of exhaust gas recirculated through the EGR conduit to the engine. The one or more processors are configured to designate operational settings for the EGR valve during the trip of the vehicle system to control an amount of exhaust gas recirculated through the EGR conduit to the engine as a function or at least one of time or location during the trip.

In another embodiment, a method includes determining, based on trip information about a trip for a vehicle system having a vehicle particulate filter (VPF) disposed in an exhaust passage of the vehicle system, one or more regeneration-incompatible (RI) portions of the trip. The RI portions are associated with operating conditions of the vehicle system that are unsuitable for contemporaneous active regeneration of the VPF. The method also includes scheduling an active regeneration (AR) event for the vehicle system based on the one or more RI portions of the trip. The AR event occurs during a regeneration portion of the trip.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
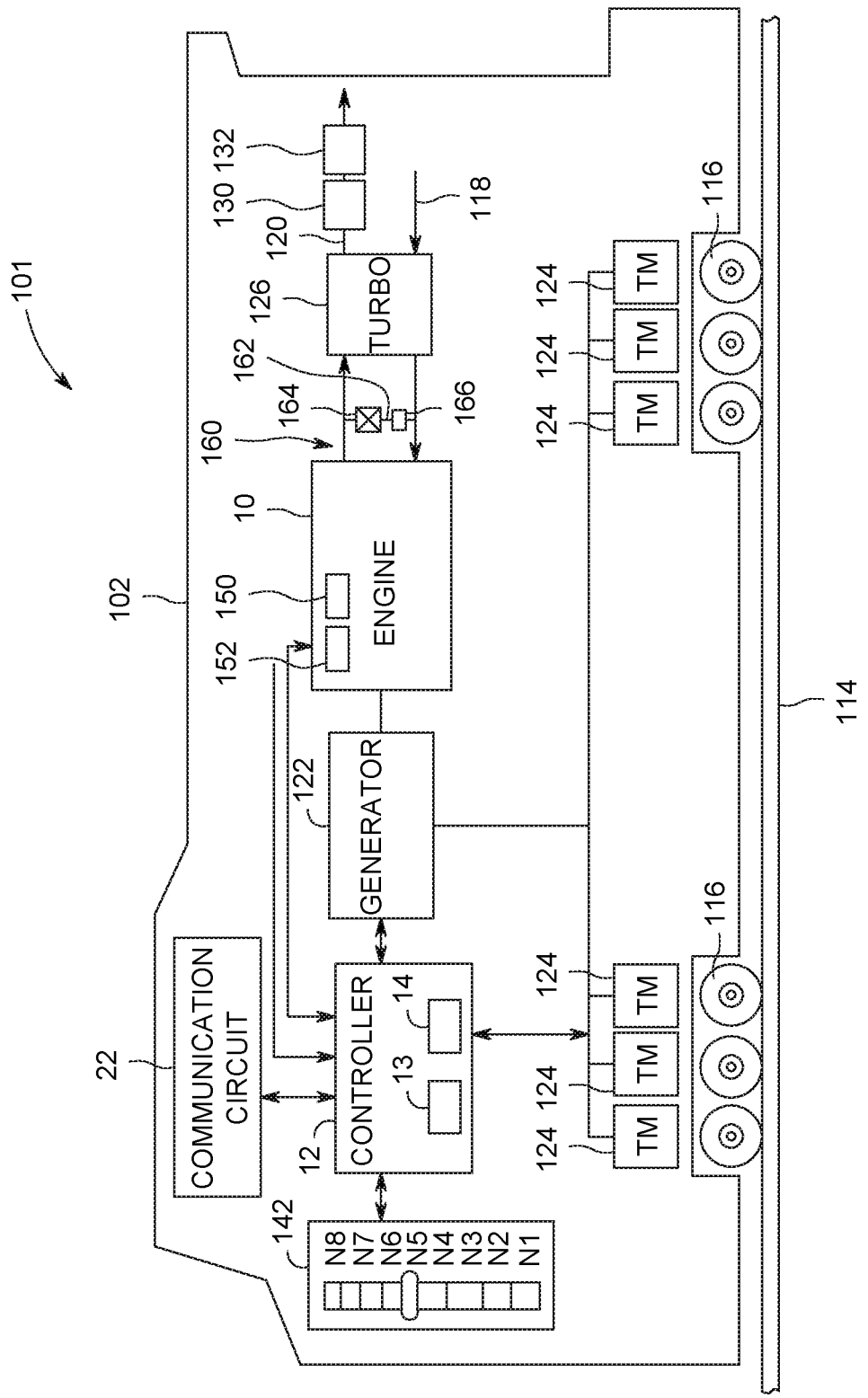
FIG. 1 is a schematic diagram of a control system associated with a vehicle system according to an embodiment.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system" or "device" may include a hardware and/or software system that operates to perform one or more functions. For example, a unit, device, or system may include a computer processor, controller, or other logic-based device that performs operations based on instructions stored on a tangible and non-transitory computer readable storage medium, such as a computer memory. Alternatively, a unit, device, or system may include a hard-wired device that performs operations based on hard-wired logic of the device. The units, devices, or systems shown in the attached figures may represent the hardware that operates based on software or hardwired instructions, the software that directs hardware to perform the operations, or a combination thereof. The systems, devices, or units can include or represent hardware circuits or circuitry that include and/or are connected with one or more processors, such as one or more computer microprocessors.

One or more embodiments of the inventive subject matter described herein provide systems and methods for controlling movement of a vehicle system along a route to control regeneration of an engine exhaust filter (also referred to as a vehicle particular filter (VPF) and a diesel particular filter (DPF)) of the vehicle system. A control system performs an active regeneration to remove trapped particular matter from the exhaust filter at a time that avoids identified inopportune times during a trip of the vehicle system. Performing the active regeneration includes increasing a temperature of exhaust gas to burn particulate matter, such as soot, that is entrapped in the exhaust filter. This results in the filter being cleaned. The particulate matter may be burned by increasing the temperature of exhaust gas and/or heating the substrate directly using plasmas, microwaves, electrical heating, or the like. The active regeneration chemical reaction is exothermic (e.g., heat-producing), and the speed of the reaction can increase with increased temperature. The heat produced from the burning of the particulate matter may, if not sufficiently dissipated away from the filter with the exhaust, increase the speed of the combustion reaction, resulting in even more heat generated and faster reaction speeds in what is referred to as thermal runaway. The thermal runaway yields high temperatures that can damage the exhaust filter and other components of the exhaust system. One or more embodiments described herein are configured to predict and control a temperature of the exhaust gas during the trip of the vehicle system in order to maintain control over the active regeneration process to prevent a thermal runaway.

The time for initiating the active regeneration during the trip may be scheduled prior to the vehicle system traveling on the route for the trip. The scheduled time for the active regeneration may be determined based on the initial particulate load level or state of the particulate filter(s), a trip plan that designates operational settings for the vehicle system as a function of at least one of time, distance, or location along the trip. For example, the trip plan may be analyzed to estimate a particulate load level on the exhaust filter at various times during the upcoming trip to determine an estimated time during the trip that an active regeneration would be warranted based on the estimated particulate load level. Furthermore, the trip plan is analyzed to estimate inopportune times for initiating an active regeneration during the trip. The inopportune times are associated with operating conditions of the vehicle system that are incompatible or unsuitable for contemporaneous execution with an active regeneration event. The operating conditions during the inopportune times may make it more difficult to control the active regeneration event, which can damage the vehicle system due to high temperatures if uncontrolled. For example, the operating conditions may include reduced ventilation around the vehicle system (e.g., such as when traveling in a tunnel) and/or reduced gas flow rate through the exhaust system (e.g., such as when the engine idles while braking or along a decline grade), which can reduce the ability to control a contemporaneous active regeneration event. The inopportune times for initiating the active regeneration may be referred to herein as regeneration-incompatible (RI) portions of the trip.

Once the RI portions of the trip are identified, one or more active regeneration (AR) events are scheduled to be performed at certain times during the upcoming trip in order to avoid the AR events coinciding (or at least partially overlapping in time) with any of the RI portions of the trip. For example, even if the estimated particulate load level on the exhaust filter indicates that an AR event would be warranted at a first time period during the trip, the AR event is not scheduled for the first time period if the first time period coincides with one of the identified RI portions of the trip. Instead, the AR event may be scheduled at a second time period that is at least partially earlier in time than the first time period. The second time period is selected in order to provide sufficient time for the active regeneration process to adequately remove soot and other particulates to clean the exhaust filter, while ensuring that the AR event concludes prior to the RI portion such that the AR event does not coincide with the RI portion. Therefore, during the trip of the vehicle system along the route, the vehicle system may perform the AR event during the scheduled second time period. The particulate load level on the exhaust filter just prior to initiating the AR event may be at least slightly below a load capacity threshold that typically indicates that an AR event is warranted, but it may be desirable to perform the AR event early in order to avoid the AR event coinciding with an RI portion of the trip, which reduces control over the AR event.

The AR event may be performed by increasing a temperature of the exhaust gas to at least a designated regeneration threshold temperature. The temperature of the exhaust gas may be increased by supplying additional fuel to the engine to increase the output of the engine or by supplying additional fuel to the exhaust gas downstream of the engine. Other methods to increase the exhaust temperature for initiating an AR event may include modifying engine settings to cause the engine to operate less efficiently, providing more energy in the form of heat, and using electricity to heat the exhaust via the use of resistive elements in the exhaust. Once the temperature of the exhaust gas is sufficiently high, the soot entrapped on the filter starts to combust, yielding carbon-based gaseous by-products. Alternatively, the AR event may be performed by heating the substrate of the exhaust filter using plasmas, microwaves, electrical heating, or the like.

At least one technical effect of controlling the movement of the vehicle system during the trip to avoid performing AR events that coincide with RI portions of the trip is better control of the regeneration process, reducing the risk of thermal runaway that can damage the vehicle system. Furthermore, since the AR events may be scheduled and/or planned prior to the vehicle system traveling on the route during the trip, the AR events may be incorporated into a trip plan that controls movement of the vehicle system to improve one or more operating conditions and/or satisfy one or more objectives (e.g., reduce fuel consumption) relative to controlling the vehicle system along the same trip without implementing the trip plan. By scheduling the AR events before a trip, numerous factors may be considered, such as an estimated particulate load level on the exhaust filter, an engine operating condition, a location and condition of the vehicle system along the route, etc. in the determination of when to schedule an AR event. By contrast, some systems may perform AR events based only on one factor, such as the monitored or estimated particulate load level on the filter, which may result in performing active regeneration at inopportune times or locations during the trip, increasing the risk of thermal runaway. Due to the increased control over exhaust temperatures, another technical effect of the embodiments disclosed herein may be reduced wear of the exhaust filter and/or other exhaust components in the vehicle system, resulting in increased life spans of the parts.

In one or more embodiments, a control system is described for controlling movement of a vehicle system that includes a vehicle exhaust filter according to a trip plan configured to reduce an overall fuel consumption of the vehicle system during a trip relative to, for example, control of the vehicle system during the trip based on trip schedules and regulations (e.g., speed limits) but without relying on the trip plan. For example, the overall fuel consumption includes fuel that is directed to the engine and burned for providing power for tractive efforts and optionally also for powering various auxiliary loads of the vehicle system (e.g., HVAC systems, electrical systems, and the like). The overall fuel consumption also includes fuel that is used for increasing the temperature of exhaust gas in the vehicle system to perform an active regeneration of an exhaust filter. Therefore, the overall fuel consumption is a sum of a first amount of fuel used for providing power and a second amount of fuel used for active regeneration. The control system therefore takes into account fuel used for active regenerations when determining how to control the vehicle system during the trip to reduce overall fuel consumption.

For example, the trip plan may provide settings that control an amount of exhaust gas that is recirculated to the engine. The amount of exhaust gas recirculation (EGR) supplied to the engine is used to control gas composition in the engine combustion chamber, which affects fuel consumption, NOx emissions, and particulate generation. For example, increasing the amount of EGR at the same boost level decreases the oxygen-to-fuel ratio and the combustion chamber oxygen concentration, which reduces flame zone temperatures leading to decreased formation of oxides of nitrogen ($NO_x$) but also increases the production of particulate matter. When controlling to the same NOx level, the fuel consumption generally decreases with increasing EGR. Therefore, by operating the engine with an increased amount of EGR, the first amount of fuel consumed for providing power may decrease, but the second amount of fuel consumed for actively regenerating the filter to remove the entrapped particulate matter may increase, offsetting the reduction in the first amount of fuel.

Since there may be a tradeoff between fuel consumption of the engine and fuel used for active regenerations, a trip plan may be generated that designates operational settings during the trip to control the oxygen-to-fuel ratio in the engine over various portions (e.g., times and/or locations) of the trip in order to reduce the overall fuel consumption of the vehicle system during the trip (relative to controlling the vehicle system along the same trip without following the trip plan). The trip plan may be generated based on trip information (e.g., trip schedule, geographic data along the route, etc.) of the upcoming trip and historical data recorded from previous trips of the vehicle system or other vehicle systems. As the vehicle system travels along the route during the trip, the vehicle system may adjust or modify the oxygen-to-fuel ratio of the engine according to the trip plan. For example, along one portion of the trip, a first amount of EGR may be directed to the engine, and along another portion of the trip, a second amount of EGR is directed to the engine in order to modify a fuel efficiency of the engine and/or a rate of particulate matter production.

The various embodiments are described in more detail herein with reference to the accompanying figures.

FIG. 1 is a schematic diagram of a control system 101 associated with a vehicle system 102 according to an embodiment. In the illustrated embodiment, the vehicle system 102 is a locomotive that may be coupled with other rail cars in a train; however, in alternative embodiments the vehicle system may be an automobile, a marine vessel, an off-highway vehicle, or the like. The vehicle system 102 is configured to travel along a route 114, which may be a rail, a road, a path, or the like, via a plurality of wheels 116. The vehicle system 102 includes an engine 10 configured to provide power for the vehicle system 102 by burning fuel. The engine 10 in an embodiment is a diesel engine, but the engine may have other configurations in other embodiments, such as a gasoline engine. The engine 10 is configured to receive intake air for combustion from an intake passage 118. The intake passage 118 receives ambient air from an air filter (not shown) that filters air from outside of the vehicle system 102. Exhaust gas resulting from combustion in the engine 10 is conveyed from the engine 10 through an exhaust passage 120 that expels the exhaust gas into the ambient air via an exhaust stack (not shown).

In the illustrated embodiment, the engine 10 is coupled to an electric power generation system, which includes an alternator/generator 122 and electric traction motors 124. For example, the engine 10 is a diesel engine that generates a torque output that is transmitted to the generator 122 which is mechanically coupled to the engine 10. The generator 122 produces electrical power that may be stored and applied for subsequent propagation to a variety of downstream electrical loads, such as HVAC systems, lighting systems, communication systems, electrical control systems, and the like. The generator 122 is electrically connected to the traction motors 124 and configured to provide electrical power to the traction motors 124. The tractive motors 124 are configured to provide tractive effort to propel the vehicle system 102. As depicted, the traction motors 124 are each connected to a different wheel 116 or a different pair of wheels 16, but other embodiments may have other arrangements of traction motors relative to the wheels.

The vehicle system 102 includes an exhaust gas treatment system coupled in the exhaust passage 120 to reduce regulated emissions. The exhaust gas treatment system includes a vehicle particulate filter (VPF) 132 within the exhaust passage 120. Since the engine 10 is a diesel engine in the illustrated embodiment, the VPF 132 may be a diesel particulate filter. Optionally, the exhaust gas treatment system also includes an oxidation catalyst 130 (e.g., a diesel oxidation catalyst (DOC). The DOC may be a discrete device that is configured to facilitate oxidation of NO to form $NO_2$. The exhaust gas treatment system optionally may include a selective catalytic reduction (SCR) catalyst, a three-way catalyst, a $NO_x$ trap, and/or various other emission control devices or combinations thereof.

The VPF 132 is configured to trap particulate matter produced during combustion that is present in the exhaust gas to remove the particulate matter from the gas emitted into the ambient environment. The particulate matter includes soot and may also include ash particulates, metallic abrasion particles, sulfates, silicates, and/or other aerosols produced during the combustion of diesel fuel. The VPF 132 may be comprised of ceramic, silicon carbide, or the like. The VPF 132 is at least partially porous, including micropores and/or nanopores, allowing gases and small particles to pass through the filter VPF 132 while entrapping larger particles. Over time, the amount of particulate matter entrapped on the VPF 132 reaches the design loading limit for the filter. As particulate matter accumulates within the VPF 132, the particular matter imposes a restriction to the flow of exhaust gas, resulting in increased back pressure on the engine 10. The increased back pressure can negatively affect engine performance, causing the engine 10 to operate less efficiently which reduces fuel economy and could potentially damage the engine 10. Therefore, to avoid increased back pressure on the engine 10, the VPF 132 is periodically regenerated to remove soot and other particulate matter from the VPF 132. For example, the VPF 132 may be regenerated in response to determining or estimating that a particulate load level on the VPF 132 has exceeded a designated load capacity threshold.

During an active regeneration, the particulate matter on the VPF 132 is burned off of the VPF 132 due to a relatively high temperature of the exhaust gas. For example, the exhaust gas may commence an active regeneration responsive to the temperature of the exhaust gas exceeding a regeneration threshold temperature. Depending on various factors including ventilation, heat dissipation, and the presence of oxidizing compounds (e.g., $NO_2$), the regeneration threshold temperature may be over 400 degrees Celsius (° C.), such as in the range of 500-600° C. With a significant presence of $NO_2$ in the exhaust passage 120, which may be provided by a catalyst, the regeneration threshold temperature may be lower, such as in the range of 300-400° C. The burning soot exits the VPF 132 as carbon-based gaseous by-products, such as $CO$ and $CO_2$. In order to initiate an active regeneration of the VPF 132, the exhaust gas in the exhaust passage 120 is raised to exceed the regeneration threshold temperature. In one embodiment, the temperature of the exhaust gas is raised by burning fuel that is supplemental to the fuel used to provide power for the vehicle system 102 in order to add heat to the exhaust passage 120. The fuel may be supplied to the engine 10 or may be supplied directly to the exhaust passage 120.

However, burning additional fuel in order to initiate an active regeneration may have undesirable consequences. For example, the overall fuel consumption of the vehicle system during the trip may increase relative to controlling the movement of the vehicle system during the trip without using fuel to start an active regeneration. Furthermore, raising the temperature of the exhaust gas by burning additional fuel may risk leading to a thermal runaway that damages the VPF 132 and/or other exhaust components of the vehicle system 102, as described above. Therefore, in one or more embodiments described herein, active regeneration (AR) events are planned and performed by tightly controlling the temperature of the exhaust gas to avoid wasting fuel and thermal runaway. For example, during an AR event, the temperature of the exhaust gas may be raised slowly and/or maintained within a designated temperature range to avoid an uncontrolled temperature increase indicative of thermal runaway.

The vehicle system 102 may further include a throttle 142 coupled to the engine 10 to indicate tractive settings and/or power levels. In this embodiment, the throttle 142 is depicted as a notch throttle; however, the throttle 142 may have other configurations in other embodiments. Each notch of the notch throttle 142 is a tractive setting that may correspond to a discrete power level of the engine 10. The power level indicates an amount of load, or engine output, delivered to the vehicle system 102 and at least partially controls the speed at which the vehicle system 102 travels. Although eight notch settings are depicted in the example embodiment, the throttle 142 may have more or less than eight notch settings in other embodiments, and may also include notches for idle and dynamic brake modes. In one or more embodiments, the notch settings of the throttle 142 are controlled automatically or manually as the vehicle system 102 travels along a route based on a trip plan that designates the notch settings as a function of at least one of time, distance, or location along a trip.

The vehicle system 102 further includes a controller 12 to control various components related to the vehicle system 102. The controller 12 may be operably coupled to various components of the vehicle system 102, such as the engine 10, the throttle 142, the traction motors 124, the alternator/generator 122, cylinder valves, fuel injectors, or the like. For example, the controller 12 may be configured to generate and transmit electromagnetic control signals to the throttle 142 to control the notch settings of the throttle 142. Alternatively, or in addition, the controller 12 may generate and transmit electromagnetic signals to a user interface device (not shown) to provide an instruction and/or notification to the operator of the vehicle system 102. The controller 12 is also configured to receive signals from various components of the vehicle system 102. The controller 12 transmits and receives the electromagnetic signals via one or more wires and/or wirelessly using a communication circuit 22 (e.g., a transceiver and associated circuitry).

The communication circuit 22 may be configured to send and receive messages between plural vehicles or components of the vehicle system 102 and/or between the vehicle system 102 and off-board locations, such as a dispatch center. The communication circuit 22 may include a transceiver and associated circuitry (e.g., an antenna) for wireless bi-directional communication of various types of messages, such as command messages, reply messages, status messages, and/or the like. The communication circuit 22 optionally may include a light emitter for optical communication. The communication circuit 22 may be configured to transmit messages to specific designated receivers and/or to broadcast messages indiscriminately. Optionally, the communication circuit 22 also includes circuitry for communicating messages over a wired connection, such as an electric multiple unit (eMU) line (not shown) between vehicles of a vehicle system 102, a catenary line or conductive rail of a track, or the like. The messages may be transmitted as electromagnetic signals.

The controller 12 represents hardware circuits or circuitry that includes, represents, and/or is connected with one or more processors 13 (e.g., microprocessors, field programmable gate arrays, integrated circuits, or other electronic logic-based devices) that perform operations based on one or more sets of instructions (e.g., software). The controller 12 may include and/or be communicatively connected with one or more digital memory 14, such as computer hard drives, computer servers, removable hard drives, etc. The memory 14 may be a tangible and non-transitory (e.g., not a transient signal) computer readable storage medium that stores the instructions on which the controller 12 operates. The memory 14 may include one or more computer hard drives, flash drives, RAM, ROM, EEPROM, and the like. Alternatively, one or more of the sets of instructions that direct operations of the controller 12 may be hard-wired into the logic of the controller 12, such as by being hard-wired logic formed in the hardware of the controller 12.

The vehicle system 102 includes a plurality of sensors for monitoring components of the vehicle system. The sensors monitor operating parameters and/or conditions of the vehicle system 102. For example, the sensors may include one or more engine sensors 150 configured to monitor one or more of engine speed, engine load, intake manifold air pressure, boost pressure, exhaust pressure, ambient pressure, ambient temperature, exhaust temperature, particulate filter temperature, particulate filter back pressure, etc. The engine sensors 150 and other sensors may be configured to convey monitored data to the controller 12 for analysis of the data. The vehicle system 102 also includes a plurality of actuators for controlling and/or adjusting operation of the vehicle system 102. For example, one or more engine actuators 152 are configured to control fuel injection timing, air flow, and the like, of the engine 10. Other actuators may include air brakes, brake air compressor, traction motors, etc. The actuators 152 may be adjusted and/or manipulated by signals from the controller 12 to allow the controller 12 to control the operational settings of the engine 10, such as load and speed. The controller 12 may receive input data from the various sensors, process the data, and then generate and transmit control signals to the vehicle system actuators in response to the input data based on instruction or code programmed therein corresponding to one or more routines.

The vehicle system 102 optionally may include a turbocharger 126 arranged between the intake passage 118 and the exhaust passage 120. The turbocharger 126 increases an amount or rate of ambient air drawn into the intake passage 118 in order to increase power output and/or engine-operating efficiency. The turbocharger 126 may include a compressor (not shown) which is at least partially driven by a turbine (not shown). In the illustrated embodiment, the turbocharger 126 is positioned along the exhaust passage 120 upstream of the exhaust gas treatment system (e.g., the VPF 132), but the turbocharger 126 may be positioned downstream of the exhaust gas treatment system in an alternative embodiment.

The vehicle system 102 further may include an exhaust gas recirculation (EGR) system 160, which routes exhaust gas from the exhaust passage 120 to the intake passage 118 to supply the exhaust gas into the engine 10. The EGR system 160 includes an EGR conduit or passage 162 and an EGR valve 164 for controlling an amount of exhaust gas that is recirculated. By introducing exhaust gas to the engine 10, the amount of available oxygen for combustion is decreased, thereby reducing the oxygen-to-fuel ratio within the engine 10. The EGR valve 164 may be an on/off valve controlled by the controller 12, and may be considered one of the actuators. The EGR system 160 may further include an EGR cooler 166 to reduce the temperature of the recirculated exhaust gas prior to entering the intake passage 118.

Although the vehicle system 102 is illustrated with only one engine 10 and one VPF 132, it is recognized that the vehicle system 102 may include multiple engines 10 and/or multiple VPFs 132. For example, the vehicle system 102 may be a multi-genset locomotive.

Figure 2:
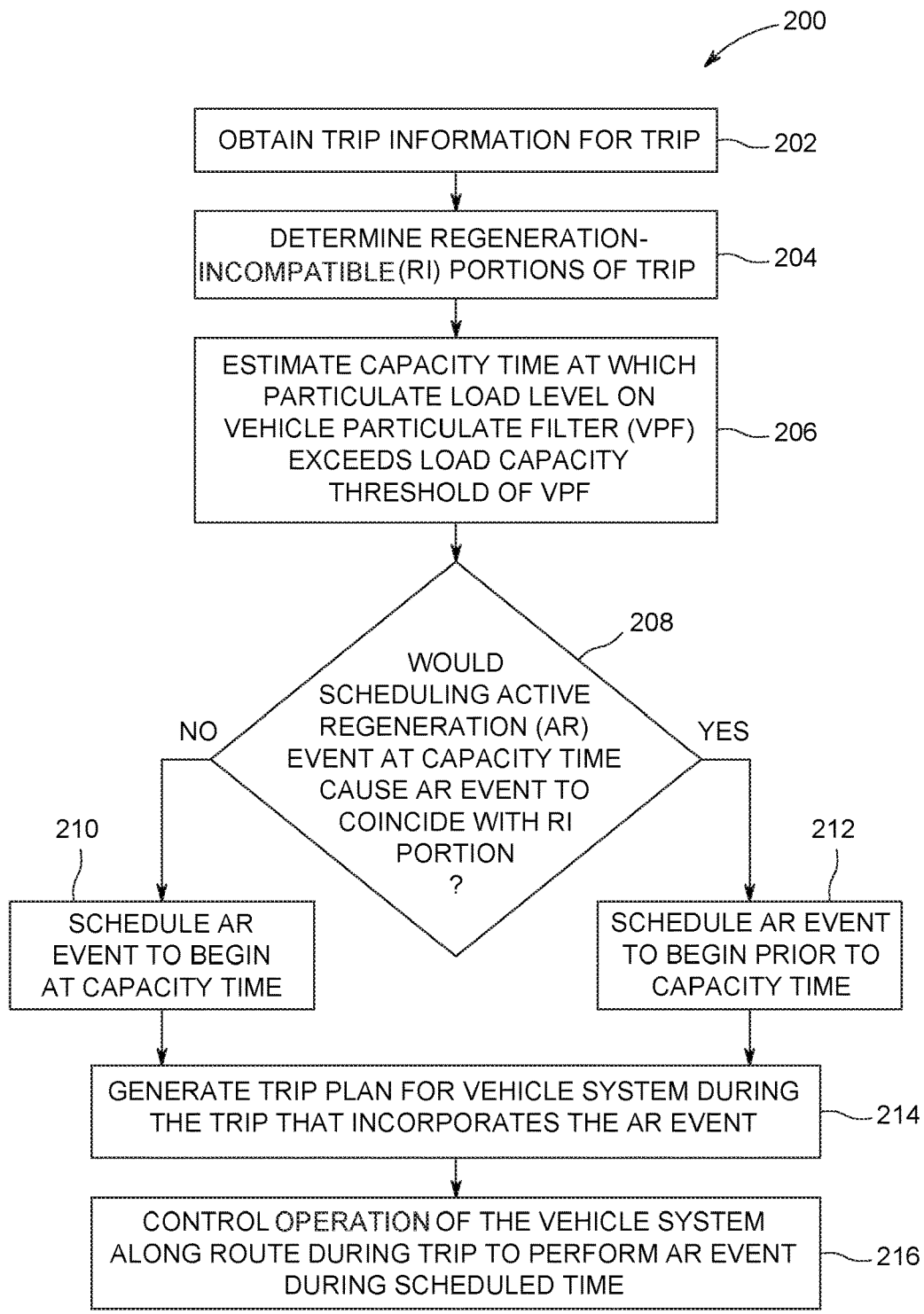
FIG. 2 is a flow chart of a method for controlling operation of a vehicle system along a route during a trip to avoid performing active regeneration of a vehicle particulate filter (VPF) at inopportune conditions during the trip.

FIG. 2 is a flow chart of a method 200 for controlling movement of a vehicle system along a route during a trip to avoid performing active regeneration of a vehicle particulate filter (VPF) of the vehicle system at inopportune conditions during the trip. The method 200 may be performed using the vehicle system 102 shown in FIG. 1. The controller 12, or the one or more processors thereof, may perform at least some of the steps of the method 200. In an alternative embodiment, the method may be performed by one or more processors located remote from the vehicle system 102 instead of the controller 12, such as one or more processors located on a wayside device or at a dispatch location. In such an embodiment, the onboard controller 12 may communicate with the remote processor(s) via the communication circuit 22 to perform the method 200. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 202, trip information for a trip of a vehicle system is obtained. The trip may be an upcoming trip upon which the vehicle system has not begun. Alternatively, the vehicle system may have already started the trip, but the trip information corresponds to an upcoming segment of the trip prior to the vehicle system traveling upon that segment. The trip information may include a trip schedule, a profile of the route to be traversed during the trip, a profile of the vehicle system embarking on the trip, and/or operational settings and/or conditions for controlling the movement of the vehicle system during the trip. The trip information may be obtained in a message from an off-board location received by the communication circuit 22 and stored in the memory 14 of the vehicle system 102 (or another digital storage device of the vehicle system 102). Alternatively, the trip information may be recorded in the memory 14 (or another digital storage device of the vehicle system 102) via a hard-wired connection while the vehicle system 102 is parked prior to the trip. In an embodiment, at least some of the trip information may be obtained in the form of a trip plan that is generated by the controller 12 or another processing device. The trip plan may designate operational settings for the vehicle system as a function of one or more of time, location, or distance along a route, as described in more detail below.

The trip schedule may include information about the trip, such as the route to use, departing and destination locations, anticipated departure and arrival times, locations and times of any meet and pass events along the route, locations and times for intermediate stops along the trip for changing passengers, crew, and/or cargo, and the like. The profile of the route may include information about the shape (e.g., curvature), incline, decline, and the like, of various sections of the route, the existence and/or location of tunnels, slow orders, and/or damaged sections of the route, and the like. The profile of the vehicle system may include information about the vehicle system, such as a weight of the vehicle system; a type, number, and arrangement of propulsion-generating vehicles in the vehicle system; and the like. The trip information concerning the operational settings and/or conditions for controlling the vehicle system may include a fuel efficiency, maximum output power (e.g., horsepower or tractive effort), and emissions of the one or more engines of the vehicle system; a particulate load capacity of a vehicle particulate filter (VPF) in the exhaust passage of the vehicle system; historical data of a particulate entrapment rate on the VPF; a calculated particulate load level currently on the VPF prior to starting the trip; expected or estimated tractive and/or braking settings of the vehicle system during the trip, and the like. For example, if a trip plan for the vehicle system is already generated, at least some of the trip information, such as the operational settings and/or conditions, may be obtained directly from the trip plan.

At 204, one or more regeneration-incompatible (RI) portions of the trip are determined based on the trip information. For example, one or more processors may analyze the trip information, prior to the vehicle system traveling along the route during the trip, to identify the one or more RI portions. The RI portions may be identified in terms of time, distance, or location during the trip. The RI portions are associated with operating conditions of the vehicle system that are unsuitable for contemporaneous active regeneration of the VPF. Since the RI portions are determined prior to the trip, the operation conditions are predicted operating conditions expected to be experienced by the vehicle system during the trip. For example, the operating conditions associated with the RI portions may make it difficult to control an active regeneration (AR) event occurring at the VPF. For example, the operating conditions at RI portions may cause in a temperature increase in the exhaust passage that could reduce control over the AR event, potentially resulting in a thermal runaway event that could damage the VPF and/or other exhaust components. Therefore, RI portions of the trip are flagged as times and/or locations along the route at which to avoid active regeneration during the upcoming trip.

One example of an operating condition associated with an RI portion of the trip is a low ventilation area of the route. In low ventilation areas, at least some of the air received in an intake passage of a corresponding vehicle may be heated air exhausted from a leading vehicle ahead of the corresponding vehicle. The heated air at the intake that is directed to the engine may result in hotter exhaust gas (relative to exhaust gas resulting from intake air at ambient temperatures). The hotter exhaust gas may speed up an active regeneration reaction, producing more heat in the exothermic reaction. The additional heat may further increase the exhaust gas temperature in the corresponding vehicle and/or may be exhausted and received in an intake passage of a trailing vehicle, causing the same phenomenon within the trailing vehicle. Therefore, in low ventilation areas, reduced ambient air flow (e.g., relative to areas with higher ventilation) can result in increased exhaust temperatures that can reduce control over an active regeneration reaction at the VPF. Some examples of low ventilation areas include tunnels, narrow canyons, meet and pass locations (e.g., in which a vehicle is surrounded on both sides by other vehicles), and the like. The low ventilation areas may be objectively identified based on an estimated volume of space between the vehicle system and an obstructing or enclosing member (e.g., a tunnel, an adjacent vehicle, an adjacent rock formation, or the like) being below a designated volume threshold, an estimated flow rate of air impacting the vehicle system being below a designated air flow threshold, a temperature of the air within an intake passage of the vehicle system being above a threshold temperature, or the like.

Another example of an operating condition associated with an RI portion of the trip is an engine of the vehicle system operating below a designated load threshold. For example, the engine operates below the designated load threshold when the engine is idling. When the engine operates at low loads (e.g., speeds and/or power levels), a flow rate of the exhaust gas through the exhaust passage may be reduced relative to the flow rate of the exhaust gas when the engine operates at higher loads. The designated load threshold may be in the range of 300-500 RPMs, such as 400 RPMs. If the engine drops to idle (or another low operating load below the load threshold) while an AR event is occurring in the exhaust passage, the reduced flow rate of the exhaust gas may not be able to sufficiently dissipate the heat that is generated by the regeneration process from the exhaust passage, resulting in increased temperatures that could potentially lead to a thermal runaway. Therefore, operating the engine below the designated load threshold contemporaneously with the performance of an AR event reduces the ability to cool the VPF, which can damage (e.g., crack) the VPF and/or other exhaust components. During the trip, the operating condition of the engine may be below the designated load threshold in various situations, such as when the vehicle system is parked and idling (e.g., such as at a planned stop), traveling along a decline grade (e.g., downhill), braking (e.g., slowing), and the like.

Another example of an operating condition associated with an RI portion of the trip is a vehicle system idling for longer than a threshold amount of time. For example, in an embodiment in which the vehicle system is a train, the train may be scheduled to spend a significant amount of time idling in a railyard, such as over ten hours. The idling condition may result in a significant build-up of trapped particulate matter on the VPFs of the train. The exhaust temperature while idling is too low to achieve an active regeneration to burn off the particular matter. The back pressure on the engines is low while idling in the railyard. However, upon accelerating from idle, the back pressure increases significantly due to the increased exhaust flow rate and buildup of particulate matter on the VPFs. The increased back pressure may make regeneration difficult to achieve and/or control.

Yet another example of an operating condition associated with an RI portion of the trip is a particulate load level of the VPF (e.g., representing an amount of particulate matter entrapped on the VPF) exceeding an over-capacity threshold of the VPF. The over-capacity threshold is greater than a load capacity threshold that is used to indicate when an active regeneration should be performed to reduce the particulate matter on the VPF. For example, the load capacity threshold may correspond to a particulate load level on the VPF that saturates 80%, 85%, 90%, or the like, of the VPF, while the over-capacity threshold may correspond to a particulate load level that saturates 100% of the VPF. If an active regeneration is not performed proximate to the particulate load level exceeding the load capacity threshold of the VPF, then particulate matter continues to accumulate on the VPF. Eventually, the particulate load level will exceed the over-capacity threshold of the VPF, which indicates a level of particulate loading that may be too high to safely remove using traditional active regeneration techniques (e.g., by heating the exhaust temperature to a sufficiently high temperature to burn the entrapped particulate matter). For example, since the active regeneration process is an exothermic reaction and the particulate matter is effectively the fuel, the high concentration of particulate matter present when the particulate load level exceeds the over-capacity threshold generates a great amount of heat that could result in a thermal runaway.

Still another operating condition associated with an RI portion of the trip may be the performance of active regeneration on multiple VPFs in the vehicle system during the same time. The multiple VPFs may be associated with different engines within a single propulsion-generating vehicle of the vehicle system, such as multiple engines within a single locomotive, or may be associated with different engines in different propulsion-generating vehicles of the vehicle system, such as different locomotives in the same train (e.g., vehicle system). For example, the number of VPF potentially contained within a train could range from 1 to 24 or more. If a consist of a vehicle system consists of four locomotives having VPFs, then it would be undesirable for all four to perform active regeneration in an overlapping time period, as it may result in reduced control of the train, increased emissions that exceed regulations, or the like. For example, if one of the locomotives is performing an active regeneration, then that time period may be considered as an RI portion of the trip for the other locomotive in the train, in order to avoid multiple active regenerations occurring at the same time. Optionally, the RI portion may represent a time that at least a certain number of VPFs on the vehicle system are performing an active regeneration, such as at least two VPFs. For example, for a vehicle system with four or more VPFs in total, two VPFs concurrently performing an active regeneration may be allowable, but three VPFs concurrently performing an active regeneration may be undesirable. Therefore, when two VPFs in the vehicle system concurrently perform an active regeneration, that overlapping time period may be considered as an RI portion for the engines and/or vehicles associated with other VPFs.

At 206, a capacity time at which the particulate load level on the VPF exceeds the load capacity threshold of the VPF is estimated. The capacity time refers to a time during the trip that an active regeneration is warranted or suitable in order to remove the particulate matter from the VPF. The capacity time is estimated because the determination is made prior to the vehicle system traveling on the route during the trip, such that the determination is predictive in nature. The capacity time is estimated based on the trip information, which is used to estimate the particulate load level on the VPF at various times and/or locations along the route during the trip. By estimating or calculating an initial particulate load level on the VPF prior to a trip and also estimating how the particulate load level changes during the trip, the capacity time is determined as the time that the particulate load level is predicted to exceed the load capacity threshold. For example, if the VPF has an initial particulate load level that is 60% of capacity at the start of a trip, then the capacity time will occur at an earlier time along the trip than if the initial particulate load level is 30% of capacity at the start of the trip.

In an embodiment, the particulate load level of the VPF during the upcoming trip may be estimated as a function of time and/or location. The particulate load level may be estimated by analyzing the trip information for the upcoming trip and historical data related to the VPF and/or particulate loading rates on the VPF. Engine operating settings and/or conditions affect the amount of particulate matter produced, so relevant trip information for the upcoming trip used in the estimation of the particulate load level may include designated tractive settings (e.g., notch settings), route grading, vehicle speeds, etc., at various times/locations during the trip. Historical data may include oxidation catalyst performance, passive regeneration rate using $NO_2$, VPF filtration efficiency, particulate matter production rates in the engine, particulate matter entrapment rates on the VPF, and the like. Passive regeneration refers to the $NO_2$ in the exhaust gas reacting with soot and other particulate matter to remove particulate matter from the VPF in lower temperature conditions relative to active regeneration. The $NO_2$ is more reactive than oxygen to oxidize particulate matter. The VPF filtration efficiency is a measure of an amount of particulate matter in the exhaust gas that gets trapped by the VPF relative to an amount of particulate matter that passes through the VPF and is emitted from the vehicle system in the exhaust gas. The VPF filtration efficiency may change over time responsive to particulate load levels on the VPF.

The particulate matter production rate in the engine is a measure of an amount of particulate matter that is produced by the engine and supplied to the VPF over time during engine operation. The particulate matter production rate may be based on operating settings of the engine, the type of fuel used, and the like. The particulate matter entrapment rate is a measure of an amount of particulate matter entrapped on the VPF over time. The particulate matter entrapment rate may indicate how quickly particulate matter accumulates on the VPF and/or how quickly the filter area of the VPF becomes saturated with particulate matter. If an initial particulate load level of the VPF is known or estimated, the particulate matter entrapment rate can be used to estimate when the particulate load level of the VPF will exceed one or more threshold levels. The historical data may also include a time that the given engine or vehicle last went through an active regeneration, the number of regenerations performed on the current VPF, the age of the VPF, and the like.

The historical data may be contained within a model or simulation. The trip information specific to the upcoming trip can be input into the model, and the model may compare the parameters/input of the upcoming trip with parameters of previous trips of vehicle systems with known outcomes (e.g., known particulate loading rates on vehicle particulate filters and the like). Based on similarities and/or differences with the previous trips, the model can estimate the particulate load level on the VPF as a function of time and/or location along the route during the upcoming trip. Alternatively, or in addition, the historical data may be stored in a digital memory storage device that is accessible to the controller.

In an alternative embodiment, a time for performing an active regeneration during the trip may be based entirely, or at least in part, on a time interval. For example, instead of estimating when the particulate load level exceeds a designated threshold amount, historical data from prior trips of the same or different vehicle systems may be used to identify a time interval between AR events. Using the time interval, a suitable time for performing an active regeneration may be determined by monitoring elapsed time from a preceding AR event performed on the VPF relative to the designated time interval.

At 208, a determination is made whether scheduling an active regeneration (AR) event at the estimated time (e.g., capacity time) that the particulate load level exceeds the load capacity threshold would cause the AR event to coincide with one of the RI portions of the trip. For example, the AR event may have a designated duration, such as around 30 minutes. The determination considers whether the duration of the AR event, starting at the capacity time, would overlap in time (or location) with any of the identified RI portions described in step 204, such as low ventilation areas or idling (or other low operating) conditions of the engine. In an embodiment, the determination considers whether the AR event overlaps in time with any of the RI portions for any length of time, regardless of whether the AR event or the RI portion begins earlier, ends later, or has a longer duration. In another embodiment, the determination considers whether the AR event and any RI portion overlap in time for at least a designated minimum time period, such as five or ten minutes. Therefore, in such an embodiment, an AR event that overlaps with only one RI portion for only two minutes would not be considered to coincide with any of the RI portions because the minimum time period is not met. Although the analysis between the proposed AR event starting at the capacity time and the one or more RI portions is described in terms of time, the analysis can alternatively be described in terms of location along the route during the trip. For example, one or more processors may determine whether starting the AR event at the capacity time would result in the AR event occurring as the vehicle system travels through a tunnel along the route.

If the determination indicates that scheduling the AR event to begin at the capacity time would not cause the AR event to coincide with any of the RI portions, then flow of the method 200 proceeds to 210 and the AR event is scheduled to begin at the capacity time. The AR event may be scheduled to begin at a time that is approximate to the capacity time, such as within a time range of 30 seconds or one minute from the capacity time.

If, on the other hand, the determination indicates that scheduling the AR event to begin at the capacity time would indeed cause the AR event to coincide with at least one of the RI portions, then flow of the method 200 proceeds to 212. At 212, the AR event is scheduled to begin at a time that is prior to the capacity time. For example, the AR event is scheduled to begin at a time that is sufficiently prior to the corresponding RI portion such that the AR event is discrete from (e.g., does not coincide with) the RI portion. For example, the AR event may be scheduled to end prior to a beginning of the RI portion or the AR event overlaps the RI portion for a length of time that is less than a designated minimum time period). In an embodiment, for an AR event duration of 30 minutes, the AR event may be scheduled for a start time that is 30 minutes before the beginning of the corresponding RI portion. The AR event is scheduled for a period of time that is at least proximate to the corresponding RI portion to reduce the frequency, and therefore total number, of AR events during trip to reduce the amount of fuel used for regeneration during the trip. The portion of the trip in which the AR event is scheduled to occur is referred to as a regeneration portion of the trip.

Although the AR event may be moved responsive to determining that the AR event potentially coincides with a first RI portion, the new start time is selected such that the AR event also avoids the other RI portions. For example, if a second RI portion is prior to the first RI portion and there is not sufficient time to perform the AR event between the second and first RI portions, then the AR event may be scheduled for a time that is prior to the second RI portion. The AR event is moved to an earlier time in order to prevent the particulate load level on the VPF from reaching or exceeding the over-capacity threshold. For example, it may be preferable to spend more fuel during a trip as a result of performing relatively frequent AR events than risking damage to the VPF and/or other exhaust components by over-saturating the VPF with particulate matter.

Step 214 follows both steps 210 and 212. At 214, regardless of the scheduled time for the AR event, a trip plan is generated for the vehicle system during the trip that incorporates the AR event. The trip plan designates operational settings for the vehicle system as a function of at least one of time, distance, or location along the route. The operational settings are designated to control the movement of the vehicle system during the upcoming trip such that the AR event occurs during the regeneration portion of the trip as scheduled. The operational settings may include throttle settings (e.g., notch settings), brake settings, speeds, engine settings (e.g., fuel injection settings), or the like.

The trip plan may be generated to satisfy and/or improve one or more objectives (e.g., reducing fuel consumption and/or emissions generation) during the trip of the vehicle system relative to the vehicle system traveling along the route during the trip without following the trip plan. Other objectives may include reducing a travel time of the trip, improving handling, reducing noise emissions, reducing vehicle wear, and the like. The trip plan may be generated to abide by set constraints, such as speed limits, regulatory restrictions, and the like. The operational settings of the trip plan may be specific to different locations along the route. For example, the trip plan may dictate increased tractive efforts of the vehicle system 102 along an incline portion of the route, and may dictate reduced tractive efforts along a subsequent segment of the route. In an embodiment, the trip plan may be generated by the controller 12 (or the one or more processors 13 thereof) or by a remote processing device. For example, the controller 12 may be or include a software application or system such as the Trip Optimizer™ system provided by General Electric Company in order to generate the trip plan.

In an embodiment, the trip plan incorporates the AR event by designating settings that are configured to increase the temperature in the exhaust passage 120 of the vehicle system 102 when the vehicle system 102, traveling along the route during the trip, reaches the regeneration portion of the trip. For example, the trip plan may designate an increased amount of fuel to be injected into the engine 10 relative to an amount of fuel injected into the engine 10 for powering the vehicle system 102, such that the extra fuel is used to heat the exhaust gas to a temperature that exceeds the regeneration threshold to initiate the AR event. Alternatively, the trip plan may designate a certain amount of fuel to be injected directly into the exhaust passage 120. The fuel in the exhaust passage reacts with the oxidation catalyst 130 to heat the exhaust gas for initiating the AR event (instead of injecting the fuel into the engine 10). The designated settings may be configured to control operation of one or more fuel injectors, fuel valves, or the like.

Optionally, instead of generating a new trip plan, the generation of the trip plan may refer to revising an existing trip plan. For example, the trip information obtained at step 202 may include a trip plan, and step 214 merely revises the trip plan to incorporate the AR event. In addition to adding settings for adjusting fuel injection, the revision to the trip plan may include modifying the operational settings for the engine during the regeneration portion of the trip in order to maintain a temperature of the exhaust gas within a designated narrow range to control the active regeneration reaction.

At 216, the operation of the vehicle system along the route during the trip is controlled to perform the AR event during the scheduled time (e.g., regeneration portion of the trip). The operation of the vehicle system may be controlled by the trip plan. For example, the controller 12 may automatically control the engine 10, traction motors 124, brakes, and the like according to the designated tractive and braking settings in the trip plan, or the controller 12 may provide automated assistance or guidance to the operator for assisted manual control of the vehicle system. In an alternative embodiment, instead of providing additional fuel to the engine or providing fuel directly into the exhaust passage to react with an oxidation catalyst, the AR event may be performed by modifying the engine operation to produce hotter exhaust (e.g., by running the engine less efficiently), by using electrical resistors in the exhaust passage to heat the exhaust gas, or other techniques.

In one or more embodiments, the operation of the vehicle system refers to the movement of the vehicle system along the route, such that the movement is modified in order to avoid the identified RI portions. However, the operation of the vehicle system also may refer to a distribution of tractive outputs provided by multiple engines and/or vehicles of the vehicle system. For example, if it is determined that three VPFs on the vehicle system are predicted to perform an active regeneration over the same time period, then the vehicle system may be operated to modify the time that at least one of the VPFs undergoes an active regeneration. Such a modification may occur without changing how the vehicle system moves along the route, but rather by redistributing tractive efforts among the engines and/or vehicles of the vehicle system. For example, one engine with a VPF may be controlled to operate at a condition for active regeneration for a first time period in which the active regeneration would normally occur, while a second engine with a VPF, which may ordinarily undergo an active regeneration during the first time period, may be controlled to modify operation such that the VPF undergoes an active regeneration prior to the first time period such that the two active regenerations do not overlap. The modified operation of the second engine may be scheduled in advance of the trip or decided during the trip. Therefore, the vehicle system may be controlled such that multiple VPFs of the vehicle system undergo active regenerations at specific times that are based on one another to avoid too many active regenerations occurring during a common time period.

Figure 3:
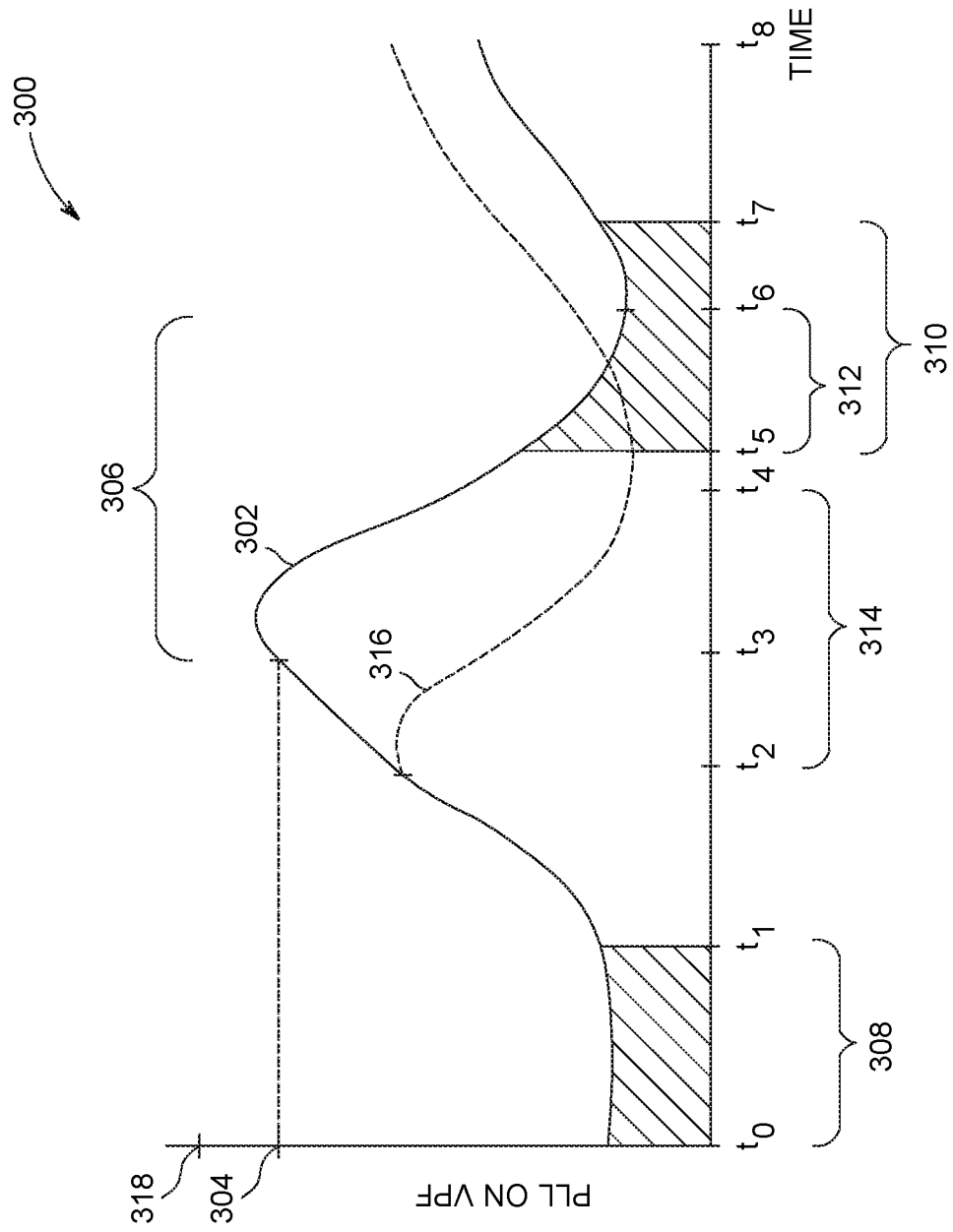
FIG. 3 depicts a graph plotting particulate load levels on a VPF over time during a trip of a vehicle system according to an embodiment.

FIG. 3 depicts a graph 300 plotting particulate load levels (PLL) on a vehicle particulate filter (VPF) over time during a trip of a vehicle system according to an embodiment. The VPF is disposed on the vehicle system within an exhaust passage. In an embodiment, the particulate load level as a function of time during the trip may be estimated by one or more processors prior to the vehicle system starting the trip (or at least moving along the portion of the trip depicted in the graph 300). The particulate load level may be estimated based on trip information and/or historical data, such as described in step 206 of the method 200 shown in FIG. 2.

The graph 300 includes an initial particulate load level plot line 302 (referred to as particulate load level 302) that does not take into account regeneration-incompatible (RI) time period (e.g., portions) during the trip for scheduling active regenerations. For example, the particulate load level 302 gradually increases between times t0 and t3, indicating that an amount of particulate matter entrapped on the VPF increases as the engine of the vehicle system operates during the trip. At time t3, the particulate load level 302, as estimated, exceeds a load capacity threshold 304 of the VPF, indicating that an active regeneration is warranted. An active regeneration (AR) event 306 occurs from around time t3 until time t6. During the AR event 306, the particulate load level 302 decreases. After the AR event 306 ends (e.g., determined based on a time period or an achieved particulate load level 302), the particulate load level 302 gradually increases again up to time t8 at the end of the graph 300.

An analysis of the trip indicates that there is a first RI time period 308 between times t0 and t1 and a second RI time period 310 between times t5 and t7. For example, the first RI time period 308 may represent a time period that the engine of the vehicle system is operating below a load threshold, such as idling. The second RI time period 310 may represent a time period that the vehicle system is traveling through a low ventilation area along the route, such as a tunnel. The AR event 306 does not coincide with the first RI time period 308. However, the AR event 306 does indeed coincide with the second RI time period 310, overlapping the RI time period 310 during an overlap period 312 between times t5 and t6. Since performance of an active regeneration while the vehicle system is in the low ventilation area could cause uncontrolled temperature increase in the exhaust gas and/or engine that could damage the vehicle system, the AR event is rescheduled.

Instead of initiating the AR event at time t3, the AR event is started at an earlier time to avoid coinciding with the second RI time period 310. For example, a scheduled AR event 314 begins at time t2 and lasts until time t4. As shown in the graph 300, an adjusted particulate load level line 316 (shown in a dashed plot line) deviates from the particulate load level 302 at time t2. The adjusted particulate load level 316 represents an estimated load level on the VPF responsive to performing the scheduled AR event 314. The scheduled AR event 314 does not coincide with either of the RI time periods 308, 310. Therefore, the AR event 314 may be easier to control and/or have a reduced risk of an uncontrolled thermal runaway relative to performing the initial AR event 306.

As shown in the graph 300, the AR event 314 begins prior to the particulate load level on the VPF reaching the load capacity threshold 304. Due to starting an active regeneration early, active regenerations may be required more often or at least earlier in time relative to scheduling AR events without accounting for RI time periods (as indicated by the adjusted particulate load level 316 being greater than the particulate load level 302 at time t8). But, the drawback of using some additional fuel to perform a few extra regenerations may be desirable over risking VPF and exhaust component damage due to thermal runaway by performing regenerations during inopportune, incompatible conditions. It is also noted on the graph 300 that the particulate load levels 302, 316 are maintained at levels below the over-capacity threshold level 318. As described above with respect to step 204 of the method 200, any time that the particulate load level is at or above the over-capacity threshold may be considered as another RI time period in which to avoid performing an active regeneration due to the high concentration of particulate matter on the VPF which can produce a great amount of heat.

Figure 4:
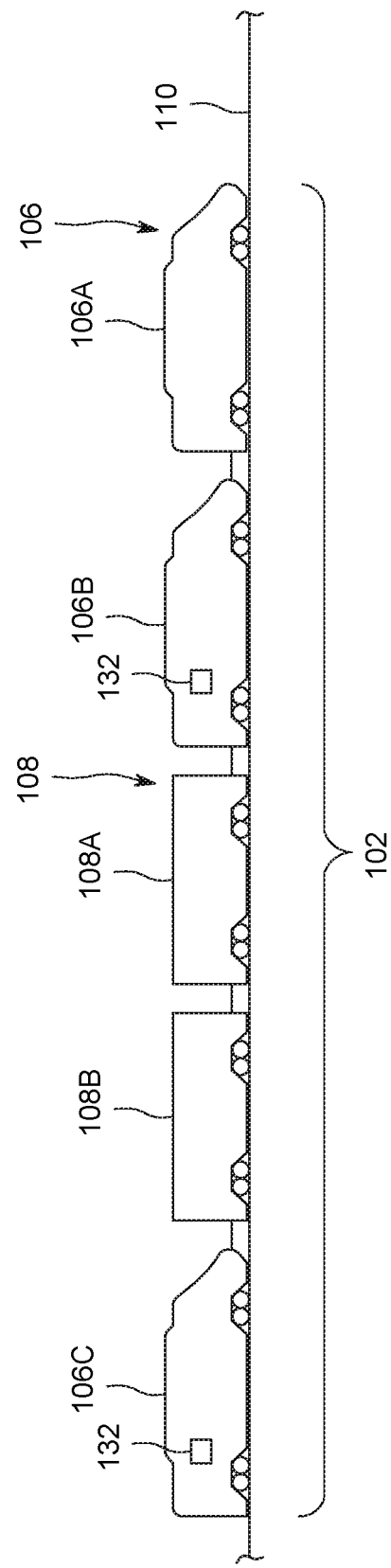
FIG. 4 illustrates the vehicle system according to one embodiment.

FIG. 4 illustrates the vehicle system 102 according to one embodiment. The illustrated vehicle system 102 has multiple vehicles, including propulsion-generating vehicles 106 (e.g., vehicles 106A, 106B, 106C) and non-propulsion-generating vehicles 108 (e.g., vehicles 108A, 108B) that travel together along a route 110. The vehicle system 102 shown in FIG. 1 may be one of the propulsion-generating vehicles 106. Although the vehicles 106, 108 are shown as being mechanically coupled with each other, the vehicles 106, 108 alternatively may not be mechanically coupled with each other. For example, at least some of the vehicles 106, 108 are not mechanically coupled to each other, but are operatively coupled to each other such that the vehicles 106, 108 travel together along the route 110 via a communication link or the like. The number and arrangement of the vehicles 106, 108 in the vehicle system 102 are provided as one example and are not intended as limitations on all embodiments of the subject matter described herein. In the illustrated embodiment, the vehicle system 102 is shown as a rail vehicle system (e.g., train) such that the propulsion-generating vehicles 106 are locomotives and the non-propulsion-generating vehicles 108 are rail cars. But, in other embodiments, the vehicle system 102 may be or include one or more aircrafts, water vessels, automobiles, mining vehicles, or other off-highway vehicles (e.g., vehicles that are not legally permitted and/or designed for travel on public roadways).

Optionally, groups of propulsion-generating vehicles 106 in the vehicle system 102 may be referred to as a vehicle consist. For example the vehicles 106A, 106B, 106C may comprise a vehicle consist. In an alternative embodiment, the vehicles 106A and 106B define a first vehicle consist, and the vehicle 106C defines a second consist of the vehicle system 102. The propulsion-generating vehicles 106 may be arranged in a distributed power arrangement. For example, the propulsion-generating vehicles 106 can include a lead vehicle (e.g., 106A) that issues command messages to the other propulsion-generating vehicles (e.g., 106B, 106C), which are referred to as remote vehicles. The designations "lead" and "remote" are not intended to denote spatial locations of the propulsion-generating vehicles 106 in the vehicle system 102, but instead are used to indicate which propulsion-generating vehicle 106 is communicating (e.g., transmitting, broadcasting, or a combination of transmitting and broadcasting) command messages and which propulsion-generating vehicles 106 are receiving the command messages and being remotely controlled using the command messages. For example, the lead vehicle may or may not be disposed at the front end of the vehicle system 102 (e.g., along a direction of travel of the vehicle system 102).

In an embodiment, a controller, such as a remote controller or a controller (e.g., controller 10 shown in FIG. 1) on the lead vehicle of a consist in a distributed power arrangement, may be configured to distribute and/or allocate different tractive effort orders for different propulsion-generating vehicles 106. Furthermore, the allocations may be made based on consideration of AR events and RI portions of a trip of the vehicle system 102. For example, the vehicle system 102 may be a mixed vehicle system such that some, but not all, of the vehicles 106 include a VPF 132 within an exhaust passage of the vehicle 106. In the illustrated embodiment, the vehicles 106B and 106C include VPFs 132, and the vehicle 106A does not include a VPF.

In one or more embodiments, tractive efforts may be allocated among the vehicles 106 as a function of time and/or location during the trip in order to provide a designated overall power output for the vehicle system 102 while avoiding unintentional, uncontrolled active regeneration within the vehicles 106B, 106C that have VPFs 132. For example, upon determining that the vehicle system 102 will be traveling through a tunnel during a first time period, the controller that allocates the tractive effort commands may command the vehicle 106A without a VPF to generate a greater tractive effort during the first time period than each of the vehicles 106B, 106C with VPFs 132. The commanded tractive efforts may correspond to tractive settings of the engines of the vehicles 106, such as notch settings or designated power outputs of the engines. The vehicles 106B, 106C may be commanded to produce less power (e.g., tractive effort) within the tunnel than the vehicles 106B, 106C otherwise would be commanded to produce in order to control exhaust gas temperatures in the vehicles 106B, 106C. Since the tunnel is a low ventilation area, running the engines of the vehicles 106B, 106C at greater operating loads could result in an unintentional and uncontrolled active regeneration of the VPFs 132 due to high exhaust temperatures. Therefore, the vehicles 106B, 106C having VPFs 132 are controlled to provide reduced tractive efforts, while the vehicle 106A without a VPF is controlled to provide an increased tractive effort to compensate for the reduction in power provided by the vehicles 106B, 106C. As described above, the total tractive effort provided by the propulsion-generating vehicles 106 may be distributed among the vehicles 106 such that the VPF 132 in the vehicle 106B does not undergo an active regeneration during a common time period as the VPF 132 in the vehicle 106C.

Referring now back to the method 200 of FIG. 2, the trip plan for the vehicle system at step 214 may be generated to include operational settings for the exhaust gas recirculation (EGR) valve 164 of the EGR system 160 (shown in FIG. 1). The trip plan may be generated with an objective of reducing overall fuel consumption by the vehicle system during the trip (e.g., relative to controlling the vehicle system to travel during the trip without following the trip plan). The overall fuel consumption includes a first amount of fuel that is provided to the engine 10 of the vehicle system 102 for generating tractive efforts for propelling the vehicle system and for generating power that is supplied to other loads on the vehicle system (e.g., HVAC, communication circuits, electrical systems, and the like). The overall fuel consumption also includes a second amount of fuel that is provided to the engine 10 or directly to the exhaust passage 120 for heating the exhaust gas to initiate and/or sustain an active regeneration of the VPF 132. The overall fuel consumption is a combination of the first and second amounts of fuel used during the trip. The amount of exhaust gas that is recirculated to the engine 10 via the EGR valve 164 may affect both the first and second amounts of fuel. Therefore, the trip plan is generated to include operational settings for controlling the EGR valve 164 as a function of time and/or location during the trip in order to reduce the overall fuel consumption of the vehicle system 102 during the trip.

For example, as an amount of recirculated exhaust gas provided to the engine increases, an oxygen-to-fuel ratio within the engine may decrease. The reduction in the oxygen-to-fuel ratio may cause the engine to operate with better fuel economy, thus reducing the first amount of fuel that is used to generate power for the vehicle system. However, the oxygen-to-fuel ratio reduction also may result in an increased amount and/or rate of particulate matter entrapment on the VPF 132, due to one or more of an increase in particulate matter production or a reduction in $NO_2$ formation (e.g., providing less passive oxidization of the particulate matter on the VPF 132). As a result of the increased particulate entrapment, additional and/or longer active regenerations are needed to clean the VPF 132, increasing the second amount of fuel that is used for active regenerations. Therefore, reducing the oxygen-to-fuel ratio may generally result in a reduced first amount of fuel used during the trip, but an increased second amount of fuel. Similarly, increasing the oxygen-to-fuel ratio in the engine by actuating the EGR valve 164 to reduce an amount of exhaust gas recirculated to the engine 10 may have inverse consequences, such as an increased first amount of fuel used during the trip and a reduced second amount of fuel.

Although there is a general tradeoff between the first and second amounts of fuel by modifying an amount of exhaust gas recirculated to the engine, one or more processors may analyze the trip information for an upcoming trip of the vehicle system and/or historical data to generate a plan for modifying the EGR valve 164 during the trip to reduce the overall fuel consumption by the vehicle system during the trip. The plan for controlling the EGR valve 164 may be a part of the trip plan generated at step 214 of the method 200. The trip plan may designate operational settings for the EGR valve 164 as a function of time and/or location during the trip to control the amount of recirculated exhaust gas supplied to the engine. The operational settings may modify a position of the EGR valve 164 with respect to time or location during the trip such that a first amount of exhaust gas is recirculated to the engine during a first time period and a different, second amount of exhaust gas is recirculated to the engine during a second time period. The operational settings for the EGR valve 164 are based on trip information, including aspects of the route and engine settings. For example, a first segment of a route with a relatively large number of hills may require a vehicle system traveling on the first segment to spend more time in high notch tractive settings relative to the vehicle system traveling on a different, second segment of the route that has fewer hills. Based on the prescribed tractive settings, the generated trip plan may designate operational settings for controlling the EGR valve 164 to provide more recirculated exhaust gas to the engine while the vehicle system travels along the hilly first segment of the route, and less recirculated exhaust gas to the engine while the vehicle system travels along the second segment of the route.

Although one or more embodiments herein describe scheduling AR events prior to a trip of a vehicle system, it is recognized that the AR events may be scheduled after the trip has started and/or modified or revised during the trip. For example, the controller of the vehicle system may monitor the engine operations and/or the particulate load levels on the VPFs during the trip. If the monitored parameter values differ from expected or predicted parameter values by more than designated threshold amounts, then the controller may revise the trip plan to incorporate the updated information. The revisions to the trip plan may involve rescheduling an AR event to start a few minutes earlier or later than previously scheduled and/or modifying engine settings in order for the active regeneration to occur as originally scheduled. Some parameters that may be monitored during the trip include back pressure on the engine, exhaust temperature, engine temperature, engine tractive effort, emissions output, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
one or more processors configured to be operably coupled to a vehicle system configured to travel along a route during a trip, the vehicle system having a vehicle particulate filter (VPF) disposed within an exhaust passage of the vehicle system, the one or more processors configured to determine, based on trip information about the trip of the vehicle system, one or more regeneration-incompatible (RI) portions of the trip, the RI portions associated with operating conditions of the vehicle system that are unsuitable for contemporaneous active regeneration of the VPF, the one or more processors further configured to schedule an active regeneration (AR) event for the vehicle system based on the one or more RI portions of the trip, the AR event occurring during a regeneration portion of the trip.

2. The system of claim 1, wherein the one or more processors are configured to schedule the AR event such that the regeneration portion of the trip is discrete from the one or more RI portions of the trip.

3. The system of claim 1, wherein, during performance of the AR event, the one or more processors are configured to introduce a fuel into the exhaust passage to heat an exhaust gas in the exhaust passage.

4. The system of claim 1, wherein the one or more processors are further configured to control operation of the vehicle system during the trip to perform the AR event during the regeneration portion of the trip.

5. The system of claim 1, wherein the one or more processors are configured to determine the one or more RI portions and schedule the AR event prior to the vehicle system starting the trip.

6. The system of claim 1, wherein the one or more processors are further configured to estimate, based on the trip information, a capacity time during the trip at which a particulate load level on the VPF exceeds a load capacity threshold of the VPF as the vehicle system travels during the trip.

7. The system of claim 6, wherein the one or more processors are configured to determine whether beginning the AR event at the capacity time causes the AR event to coincide with the one or more RI portions of the trip, and, responsive to determining that the AR event beginning at the capacity time does not cause the AR event to coincide with the one or more RI portions, the one or more processors are configured to schedule the AR event to begin at the capacity time.

8. The system of claim 7, wherein, responsive to determining that the AR event beginning at the capacity time causes the AR event to coincide with a corresponding one of the one or more RI portions of the trip, the one or more processors are configured to schedule the AR event to begin prior to the capacity time such that the regeneration portion of the trip ends prior to a start of the corresponding RI portion of the trip.

9. The system of claim 1, wherein the one or more processors are configured to identify the operating conditions of the vehicle system that are unsuitable for contemporaneous active regeneration of the VPF as including at least one of the vehicle system moving in a low ventilation area along a route, an engine of the vehicle system operating below a designated load threshold, or a particulate load level of the VPF exceeding an over-capacity threshold of the VPF.

10. The system of claim 1, wherein the one or more processors are further configured to generate a trip plan that designates operational settings for the vehicle system as a function of at least one of time or location along a route, the one or more processors designating the operational settings in the trip plan to control operation of the vehicle system during the trip such that the AR event occurs during the regeneration portion of the trip as scheduled.

11. A system comprising:
one or more processors configured to be operably coupled to a vehicle system configured to travel along a route during a trip, the vehicle system having an engine, a vehicle particulate filter (VPF) disposed within an exhaust passage of the vehicle system that receives exhaust gas from the engine, and an exhaust gas recirculation (EGR) system including an EGR conduit and an EGR valve, the EGR conduit extending from the exhaust passage to an intake passage of the engine, the EGR valve regulating an amount of exhaust gas recirculated through the EGR conduit to the engine, the one or more processors configured to designate operational settings for the EGR valve during the trip of the vehicle system to control an amount of exhaust gas recirculated through the EGR conduit to the engine as a function of at least one of time or location during the trip.

12. The system of claim 11, wherein the one or more processors are configured to designate the operational settings for the EGR valve in order to reduce overall fuel consumption by the vehicle system during the trip relative to controlling the vehicle system during the trip without using the operational settings, the overall fuel consumption including a first amount of fuel used during the trip for generating power for the vehicle system and a second amount of fuel used during the trip for at least one of initiating or sustaining an active regeneration (AR) event in the exhaust passage to reduce a particulate load level on the VPF.

13. The system of claim 12, wherein the one or more processors are configured to introduce the second amount of fuel at least one of into the intake passage for reaction within the engine or into the exhaust passage for reaction within the exhaust passage, the second amount of fuel used to heat the exhaust gas in the exhaust passage to at least one of initiate or sustain the AR event.

14. A method comprising:
determining, based on trip information about a trip for a vehicle system having a vehicle particulate filter (VPF) disposed in an exhaust passage of the vehicle system, one or more regeneration-incompatible (RI) portions of the trip, the RI portions associated with operating conditions of the vehicle system that are unsuitable for contemporaneous active regeneration of the VPF; and
scheduling an active regeneration (AR) event for the vehicle system based on the one or more RI portions of the trip, the AR event occurring during a regeneration portion of the trip.

15. The method of claim 14, wherein the one or more RI portions are determined and the AR event is scheduled prior to the vehicle system starting the trip.

16. The method of claim 14, wherein the regeneration portion of the trip is discrete from the one or more RI portions of the trip such that the AR event does not coincide with the one or more RI portions.

17. The method of claim 14, wherein the AR event is configured to reduce a particulate load level on the VPF by increasing a temperature within the exhaust passage to remove particulate matter from the VPF.

18. The method of claim 14, further comprising controlling operation of the vehicle system during the trip to perform the AR event during the regeneration portion of the trip.

19. The method of claim 14, further comprising estimating, based on the trip information, a capacity time during the trip at which a particulate load level on the VPF exceeds a load capacity threshold of the VPF as the vehicle system travels during the trip.

20. The method of claim 19, wherein scheduling the AR event includes determining whether beginning the AR event at the capacity time causes the AR event to coincide with the one or more RI portions of the trip, and, responsive to determining that the AR event beginning at the capacity time does not cause the AR event to coincide with the one or more RI portions, the AR event is scheduled to begin at the capacity time.

21. The method of claim 20, wherein, responsive to determining that the AR event beginning at the capacity time causes the AR event to coincide with a corresponding RI portion of the one or more RI portions of the trip, the AR event is scheduled to begin prior to the capacity time such that the regeneration portion of the trip ends prior to a start of the corresponding RI portion of the trip.

22. The method of claim 14, wherein the operating conditions of the vehicle system that are unsuitable for contemporaneous active regeneration of the VPF include at least one of the vehicle system moving in low ventilation area along a route traveled by the vehicle system, the engine of the vehicle system operating below a designated load threshold, or a particulate load level of the VPF exceeding an over-capacity threshold of the VPF.

23. The method of claim 14, further comprising generating a trip plan that designates operational settings for the vehicle system as a function of at least one of time or location along a route, the operational settings in the trip plan designated to control movement of the vehicle system during the trip such that the AR event occurs during the regeneration portion of the trip as scheduled.

24. The method of claim 14, wherein one of the one or more RI portions of the trip represents the vehicle system traveling within a tunnel along the route, the operational settings in the trip plan including first tractive settings for the vehicle system as the vehicle system travels within the tunnel that are reduced relative to second tractive settings for the vehicle system as the vehicle system travels outside of the tunnel to control a temperature in the exhaust passage of the vehicle system.

* * * * *